No. 721,732. PATENTED MAR. 3, 1903.
T. H. NANCE.
PLANTER OR FERTILIZER DISTRIBUTER.
APPLICATION FILED JAN. 25, 1902.
NO MODEL. 2 SHEETS—SHEET 1.
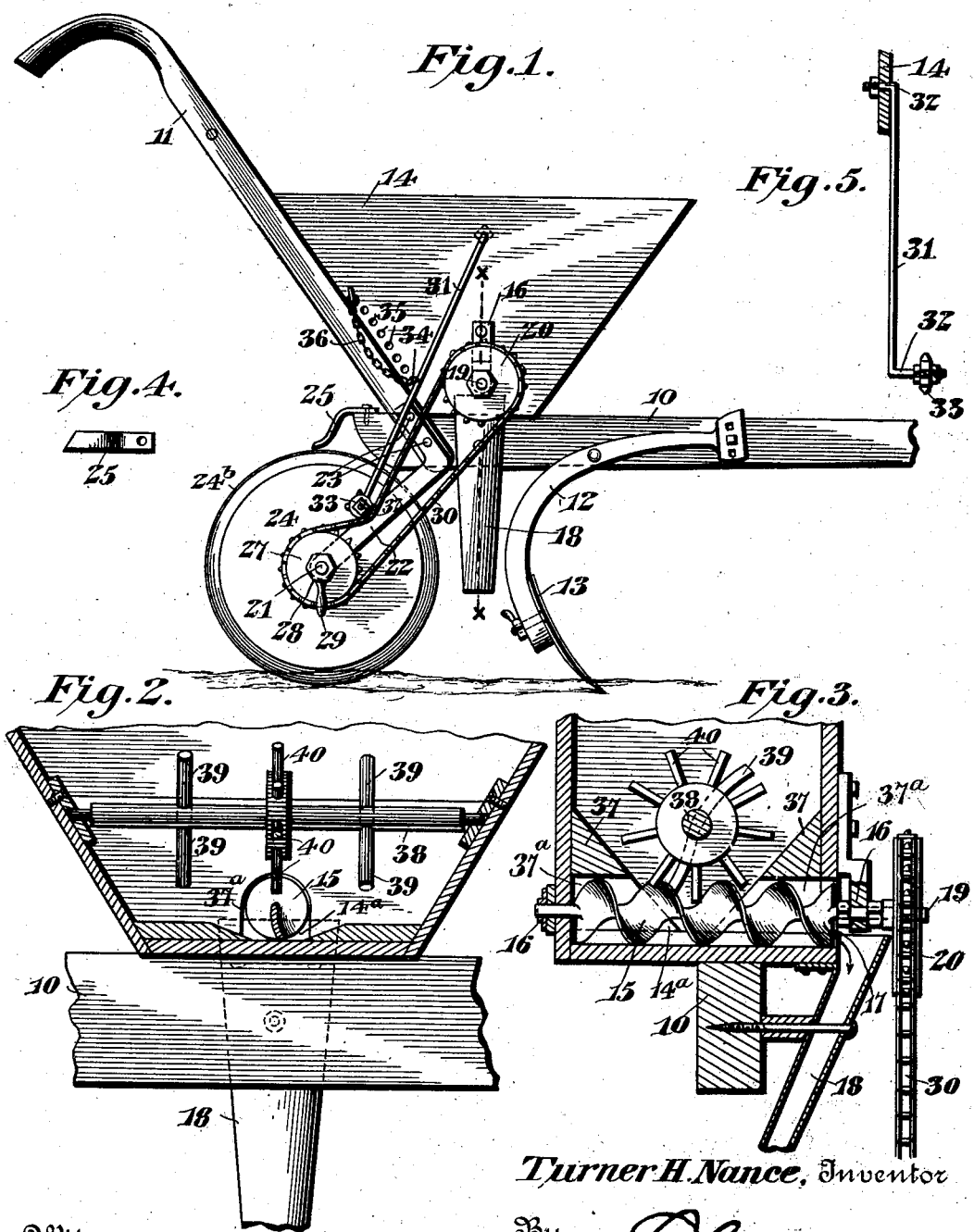
Turner H. Nance, Inventor
Witnesses No. 721,732. PATENTED MAR. 3, 1903.
T. H. NANCE.
PLANTER OR FERTILIZER DISTRIBUTER.
APPLICATION FILED JAN. 25, 1902.
NO MODEL. 2 SHEETS—SHEET 2.
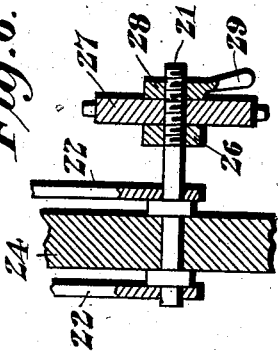
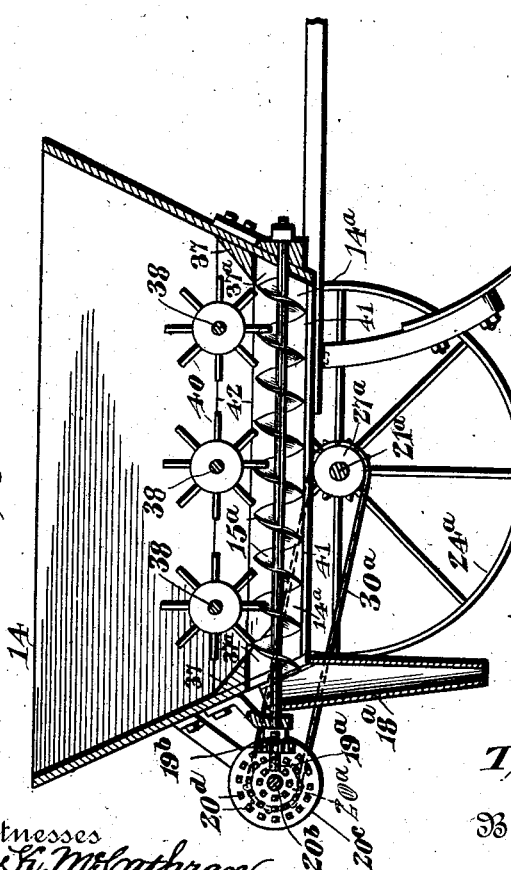
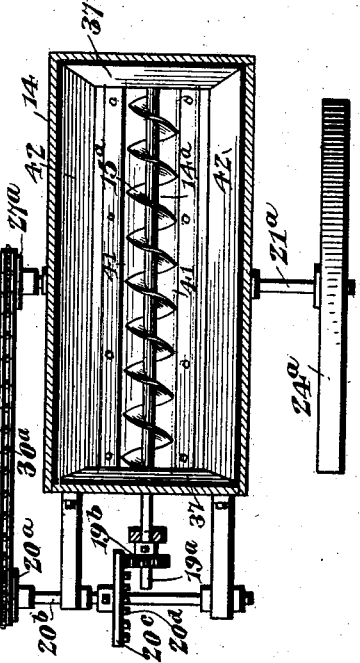
Turner H. Nance, Inventor
Witnesses

UNITED STATES PATENT OFFICE.

TURNER HUNT NANCE, OF TALLADEGA, ALABAMA, ASSIGNOR TO R. A. WARD, N. M. WEAVER, AND GEORGE McDONALD, OF CUTHBERT, GEORGIA.

PLANTER OR FERTILIZER-DISTRIBUTER.

SPECIFICATION forming part of Letters Patent No. 721,732, dated March 3, 1903.

Application filed January 25, 1902. Serial No. 91,224. (No model.)

*To all whom it may concern:*

Be it known that I, TURNER HUNT NANCE, a citizen of the United States, residing at Talladega, in the county of Talladega and State of Alabama, have invented a new and useful Planter or Fertilizer-Distributer, of which the following is a specification.

The present invention relates to agricultural machines, and particularly to that class employed in distributing fertilizers or in seeding.

One of the principal objects of the invention is to provide a machine of this character that will be positive in its feed, so that a predetermined amount of seed or fertilizer will be discharged therefrom. A further aim is to greatly simplify the mechanism of these machines without in any manner impairing their usefulness, the result being a very inexpensive structure that can be placed upon the market at a comparatively low figure.

In the accompanying drawings there are illustrated two forms of the machine as preferably constructed; but it will be understood that the invention is not limited to these two forms nor to the exact construction shown, but can be changed and modified within the scope of the claims hereto appended.

In the drawings, Figure 1 is a side elevation of the machine as constructed for distributing commercial fertilizer or seeding any of the well-known kinds of grain. Fig. 2 is a longitudinal sectional view through the hopper. Fig. 3 is a cross-sectional view taken on the line X X of Fig. 1. Fig. 4 is a detail view of the scraper for the drive-wheel. Fig. 5 is a detail view of the chain-tightening device. Fig. 6 is a sectional view through a portion of the drive-shaft, showing the form of clutch preferably employed. Fig. 7 is a longitudinal sectional view through a slightly-modified form of the machine. Fig. 8 is a cross-section of the same, and Fig. 9 is a horizontal sectional view.

Similar numerals of reference designate corresponding parts in all the figures of the drawings.

Before proceeding with the description of the structure it may be stated that while this machine is primarily intended for distributing fertilizer and planting cotton-seed it may also be advantageously employed in planting corn and various other kinds of grain. In the first three figures of the drawings the invention is shown as applied to an ordinary well-known style of shovel-plow, consisting of a beam or stock 10, to one end of which are attached the usual handles 11, while a standard 12 is secured to the intermediate portion of the stock and is provided at its lower end with the usual tongue or shovel 13. This structure in itself forms no part of the invention, which relates to the seeding mechanism attached thereto. This mechanism is constructed as follows: A receptacle 14 in the form of a hopper is secured by suitable means upon the beam 10 and to the handles 11, and in the lower part of said hopper is journaled a transversely-disposed feed-worm 15, suitable boxes 16 being provided for the purpose, said worm resting in a seat 14ª. The discharge end of this worm is located in an opening 17 in one of the side walls of the hopper, and directly beneath this opening is located the upper end of a dropper-tube 18, secured to the beam and hopper and located at an inclination, so that its lower end will be directly beneath the beam 10 and in rear of the shovel 13. The worm is provided at its discharge end with a projecting stem 19, upon which is secured a sprocket-wheel, as 20.

A driving-shaft 21 is journaled upon the lower ends of a pair of supporting-brackets 22, said brackets being preferably secured by the same bolts 23 which fasten the handles to the stock. To this drive-shaft is secured a drive-wheel 24, located between the brackets and running in the furrow formed by the shovel-plow 13. This drive-wheel is preferably provided with a metallic tire 24ᵇ, which is cleaned of adhering soil by means of a scraper 25, secured to the rear end of the stock and having its free end located adjacent to said tire. This free end is preferably beveled, as shown in Fig. 4, so that the mud or soil when removed from the drive-wheel will be thrown to one side of the same and will not, therefore, accumulate upon the frame.

As clearly shown in Fig. 6, one end of the drive-shaft 21 is provided with a threaded portion, at the inner end of which is located a shoulder 26, formed by a nut screwed upon said threaded portion, and a sprocket-wheel 27 is loosely journaled upon this threaded portion, said sprocket-wheel being normally held against movement on the shaft by means of a clutch or holding nut 28, having a handle 29, which nut is screwed upon the threaded portion and is arranged to force the sprocket-wheel 27 against the shoulder 26. Instead of this structure any well-known clutch may be provided, this being employed because of its inexpensiveness. Around the two sprocket-wheels 27 and 20 passes a sprocket or drive chain 30, whereby motion communicated to the drive-shaft by the drive-wheel will be transmitted to the worm. This sprocket-chain is tightened by a simple device clearly illustrated in Figs. 1 and 5. An arm 31 is provided at its ends with oppositely-projecting pintles 32, one of which is pivoted in an opening made for the purpose in the receptacle or hopper 14, while the other carries an idler 33, that meshes with the links of said sprocket-chain. This idler is held in engagement with the chain by means of a pin 34, detachably engaging in any of a series of openings 35, made in the hopper, as shown in Fig. 1, said pin being fastened by a chain 36, secured to the hopper.

In order to feed the material in the hopper to the central portion of the worm, and especially to prevent its passing directly through the opening 17 to the feed-tube, inclined guide-blocks 37 are secured in the bottom of said hopper over the worm, said blocks having recesses $37^a$, through which the worm passes. The adjacent faces of these blocks are spaced apart, and directly between them is located a stirrer-shaft 38, that extends longitudinally of the hopper and substantially at right angles to the worm. This shaft is provided with suitable stirrer-fingers 39, that may be of any desired construction, and it is provided with teeth that mesh with the worm. These teeth are preferably in the form of an annular series of spikes 40, secured to the shaft between the stirrer-fingers 39 and spaced a suitable distance apart, so that they will engage between the spaced threads of the worm, as clearly shown in Fig. 3.

In Figs. 7, 8, and 9 a slightly-modified structure is shown. In this case a feed-worm $15^a$ is employed which extends longitudinally of the hopper, and the feed-tube $18^a$ is located at the rear of the stock. A pair of drive-wheels $24^a$ are secured to the drive-shaft $21^a$, and the sprocket-wheel $27^a$ is attached to said shaft between the wheels. The sprocket-chain $30^a$ passes around this sprocket-wheel and to another sprocket-wheel $20^a$, that is attached to a stub-shaft $20^b$, which carries a gear-wheel $20^c$, having several annular series of teeth $20^d$, that are located adjacent to the stem $19^a$ of the worm. Upon this stem is slidably mounted a gear-wheel $19^b$, that is secured against rotation on the shaft and is arranged to mesh with any one of the annular series of teeth $20^d$, whereby the speed of the worm may be changed, as desired. Several stirring devices are employed in this case, and each is constructed in the manner already described. This latter structure is especially designed and adapted for distributing heavy manure. It often happens that stones, bits of iron, and other foreign material is mixed in with this class of fertilizer, and if such material is too large to discharge through the opening in the rear end of the hopper it will be evident that the feed will choke and result either in the stoppage or the breakage of the worm or other part of the mechanism. To prevent this, the seat $14^a$, formed for the screw, in this instance is made of a pair of curved spring-metal sections 41, each secured to the bottom along one edge, the adjacent edges of said sections being normally together. When an obstruction enters the mechanism, however, if it cannot pass through it will be forced by the worm to the bottom, and the sections 41, springing apart, as shown in dotted lines in Fig. 8, will allow it to drop from the machine. In the form shown this spring is obtained from the metal from which the sections are constructed; but it will be understood that the means for holding the two sections normally in closed position may be changed and varied as desired. Longitudinally-disposed guide-blocks 42 are also arranged in the hopper and are disposed on opposite sides of the worm.

The operation of the first-described machine will be readily apparent. As said machine is moved forwardly the drive-wheel 24 will be rotated, consequently revolving the sprocket-wheel 27, and through the medium of the chain 30 and the sprocket-wheel 20 the worm will also be rotated. As a result the material will be fed by the worm in a certain predetermined quantity to the hopper-tube, through which said material will gravitate into the furrow. The worm, furthermore, imparts a rotary movement to the stirrer, so that the teeth thereof will break up the material and prevent its bridging in the receptacle or hopper. Should it be desired to change the speed of the worm with relation to the drive-wheel, it is only necessary to remove the lower sprocket-wheel 27 and replace it by any one of a series of smaller wheels, which will be supplied with the machine. In case it is desired to transport the machine from one place to another, it is only necessary in order to prevent the waste of material to stop the feed thereof, and this can be readily accomplished by turning the holding-nut 28 so as to unclamp the sprocket-wheel 27. The drive-shaft 21 can therefore rotate freely in said sprocket-wheel, which will remain at a standstill. The operation of the modified structure is substantially the same, with the exception that no interchangeable sprocket-wheels are employed for changing the speed of the worm, this being accomplished by changing the position of the pinion or gear wheel upon the stem 19ª in the manner already described.

The advantages for this device may be summed up as follows: In the first place the feed of the material is strictly positive, and the amount may be regulated as desired. Furthermore, the construction is exceedingly simple and inexpensive, especially the provision whereby the worm performs the double function of feeding and also actuating the stirrer. The chain-tightening device is exceedingly simple, and the scraper thoroughly removes any material that may cling to the drive-wheel, said scraper being self-cleaning.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention. For instance, any well-known form or design of worm or screw conveyer may be employed instead of the specific form shown in the drawings, and the invention is therefore not to be limited to the kind illustrated.

Having thus described my invention, what I claim as new, and desire to secure by Letters Patent, is—

1. In a machine of the class described, the combination with a receptacle, of a rotatable feed-worm having a portion located in the receptacle, and a stirrer rotatably mounted in the receptacle and having teeth movable between and meshing with the threads of the worm, said stirrer being revolved thereby.

2. In a machine of the class described, the combination with a receptacle, of a rotatable feed-worm having a portion located in the receptacle, and a stirrer rotatably mounted in the receptacle in angular relation to the worm, said stirrer having teeth movable between and meshing with the threads of the worm, said stirrer being revolved thereby.

3. In a machine of the class described, the combination with a receptacle, of a dropper-tube communicating with the receptacle, a feed-worm rotatably mounted in the receptacle and leading to the dropper-tube, oppositely-inclined bottom walls arranged in the receptacle and having their lower portions spaced apart to expose an intermediate part of the worm, and a stirrer rotatably mounted in the hopper above the exposed portion of the worm between the inclined walls, said stirrer being disposed in angular relation to said worm.

4. In a machine of the class described, the combination with a receptacle, of a dropper-tube communicating with the receptacle, a feed-worm rotatably mounted in the receptacle and leading to the dropper-tube, oppositely-inclined bottom walls arranged in the receptacle and having their lower portions spaced apart to expose an intermediate part of the worm, one of said walls being located between said exposed portion of the worm and the dropper-tube to direct the material away from the tube and to the worm, and a stirrer rotatably mounted in the hopper and having teeth meshing with the exposed portion of the worm.

5. In a machine of the class described, the combination with a receptacle, of a rotatable feed-worm having a portion located in the receptacle, a stirrer-shaft journaled in the receptacle above the worm and in angular relation thereto, said shaft having stirrer-fingers, and a gear connection between the worm and the stirrer-shaft whereby the latter is rotated.

6. In a machine of the class described, the combination with a receptacle, of a rotatable feed-worm having a portion located in the receptacle, a stirrer-shaft journaled in the receptacle and provided with stirrer-fingers, and an annular series of spike-teeth secured to the stirrer-shaft and meshing with the feed-worm.

7. In a machine of the class described, the combination with a receptacle having an opening in its bottom, of seat-sections normally closing the opening and secured along their outer edges to the receptacle, said sections automatically yielding downwardly when subjected to abnormal pressure, a rotatable feed-worm mounted in the seat, and means for rotating the feed-worm.

8. In a machine of the class described, the combination with a receptacle, of a rotatable feed-worm having a portion located in the receptacle above the bottom thereof, and a stirrer-shaft journaled in the receptacle above the worm and arranged at right angles thereto.

9. In a machine of the class described, the combination with a receptacle having a discharge, of a feed-worm leading to the discharge, and a rotatable stirrer located within the receptacle and having spiked teeth that are movable between and actuated by the threads of the worm to rotate the stirrer.

10. In a machine of the class described, the combination with a receptacle having a discharge, of a feed-worm arranged above the bottom of the receptacle and leading to the discharge, and a horizontal stirrer-shaft located within the receptacle above the worm, said shaft having spiked teeth that are movable between and actuated by the threads of the worm to rotate said shaft.

11. In a machine of the class described, the combination with a receptacle having a discharge, of a feed-worm located within the receptacle and leading to the discharge, and a rotatable stirrer-shaft arranged above the worm and at right angles thereto, said shaft carrying stirrer-fingers and being furthermore provided with an intermediately-arranged series of spiked teeth that also constitute stirrers, said teeth being movable between and actuated by the threads of the worm.

12. In a machine of the class described, the combination with a receptacle having an opening in its bottom, of curved spring-metal yielding seat-sections, normally closing the opening and secured along their outer edges to the receptacle, said sections being yieldable in a downward direction, a rotatable feed-worm mounted in the seat above the sections, and means for rotating said worm.

In testimony that I claim the foregoing as my own I have hereto affixed my signature in the presence of two witnesses.

TURNER HUNT NANCE.

Witnesses:
JOHN H. SIGGERS,
FLORENCE E. WALTER.